(12) United States Patent
Tan

(10) Patent No.: US 11,378,731 B2
(45) Date of Patent: Jul. 5, 2022

(54) LIGHT COLLIMATION DEVICE, BACKLIGHT MODULE AND DISPLAY DEVICE

(71) Applicant: BOE TECHNOLOGY GROUP CO., LTD., Beijing (CN)

(72) Inventor: Jifeng Tan, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 236 days.

(21) Appl. No.: 16/618,984

(22) PCT Filed: Dec. 13, 2018

(86) PCT No.: PCT/CN2018/120810
§ 371 (c)(1),
(2) Date: Dec. 3, 2019

(87) PCT Pub. No.: WO2019/114783
PCT Pub. Date: Jun. 20, 2019

(65) Prior Publication Data
US 2020/0132907 A1    Apr. 30, 2020

(30) Foreign Application Priority Data
Dec. 15, 2017   (CN) .......................... 201711347412.2

(51) Int. Cl.
*G02F 1/13357*   (2006.01)
*F21V 8/00*   (2006.01)

(52) U.S. Cl.
CPC ......... *G02B 6/0031* (2013.01); *G02B 6/0026* (2013.01); *G02B 6/0053* (2013.01); *G02F 1/133602* (2013.01)

(58) Field of Classification Search
CPC ................................................ G02F 1/133615
See application file for complete search history.

(56) References Cited

U.S. PATENT DOCUMENTS

| 9,557,466 B2 * | 1/2017 | Fattal ................... G02B 6/0068 |
| 2006/0023449 A1 | 2/2006 | Lee et al. |

(Continued)

FOREIGN PATENT DOCUMENTS

| CN | 1719231 A | 1/2006 |
| CN | 1758102 A | 4/2006 |

(Continued)

OTHER PUBLICATIONS

First Office Action for CN Appl. No. 201711347412.2, dated Mar. 6, 2019.

*Primary Examiner* — Andrew J Coughlin
(74) *Attorney, Agent, or Firm* — The Webb Law Firm

(57) ABSTRACT

The present disclosure provides a light collimation device, a backlight module, and a display device, and relates to the field of display technology. The light collimation device includes: a curved reflection member configured to reflect a light from a light source disposed at a focus of the curved reflection member into a light guide member; the light guide member configured to make the light incident into the light guide member propagate by total reflection; and a light extraction structure disposed on the light guide member and configured to extract the light from the light guide member in a collimated manner.

20 Claims, 4 Drawing Sheets

(56) References Cited

U.S. PATENT DOCUMENTS

| | | |
|---|---|---|
| 2006/0067090 A1 | 3/2006 | Lee et al. |
| 2014/0253831 A1* | 9/2014 | Craven-Bartle ..... G02B 6/0018 349/12 |
| 2015/0036068 A1* | 2/2015 | Fattal ..................... G02B 6/005 349/15 |
| 2016/0018582 A1* | 1/2016 | Fiorentino ............. G02B 6/002 362/609 |

FOREIGN PATENT DOCUMENTS

| | | |
|---|---|---|
| CN | 102620199 A | 8/2012 |
| CN | 104880760 A | 9/2015 |
| CN | 105065976 A | 11/2015 |
| CN | 105074322 A | 11/2015 |
| CN | 106647042 A | 5/2017 |
| CN | 106662700 A | 5/2017 |
| CN | 107238974 A | 10/2017 |
| CN | 108089253 A | 5/2018 |
| KR | 20050029768 A | 3/2005 |
| WO | WO-2016/171705 A1 | 10/2016 |

\* cited by examiner

LIGHT COLLIMATION DEVICE, BACKLIGHT MODULE AND DISPLAY DEVICE

CROSS-REFERENCE TO RELATED APPLICATIONS

The present application is a U.S. National Stage Application under 35 U.S.C. § 371 of International Patent Application No. PCT/CN2018/120810, filed on Dec. 13, 2018, which claims priority to China Patent Application No. 201711347412.2, filed on Dec. 15, 2017, the disclosures of both which are incorporated by reference herein in entirety.

TECHNICAL FIELD

The present disclosure relates to a light collimation device, a backlight module, and a display device.

BACKGROUND

In the field of display technology, a surface light source has been widely applied. For example, the surface light source may serve as a backlight source.

At present, the surface light source has a large divergence angle, so a part of light cannot be effectively utilized.

SUMMARY

According to one aspect of embodiments of the present disclosure, a light collimation device is provided. The light collimation device comprises: a curved reflection member configured to reflect a light from a light source disposed at a focus of the curved reflection member into a light guide member; the light guide member configured to make the light incident into the light guide member propagate by total reflection; and a light extraction structure disposed on the light guide member and configured to extract the light from the light guide member in a collimated manner.

In some embodiments, the curved reflection member comprises a curved surface portion and a flat surface portion adjacent to the curved surface portion, wherein a focus of the curved surface portion is the focus of the curved reflection member; the flat surface portion is configured to reflect a light reflected by the curved surface portion into the light guide member.

In some embodiments, a reflection layer is disposed on the flat surface portion.

In some embodiments, a reflective light modulation grating is disposed on the flat surface portion and is configured to modulate a light not reflected by the curved surface portion to be incident into the light guide member and propagate by total reflection in the light guide member.

In some embodiments, a reflective light modulation grating between the curved surface portion and the reflective layer is disposed on the flat surface portion and is configured to modulate a light not reflected by the curved surface portion to be incident into the light guide member and propagate by total reflection in the light guide member.

In some embodiments, the reflective light modulation grating comprises a plurality of areas with different grating periods, wherein the larger an incidence angle of the light not reflected by the curved surface portion for one of the plurality of areas, the smaller a grating period of the one of the plurality of areas.

In some embodiments, the light after modulation is incident into the light guide member at a same incident angle.

In some embodiments, the light guide member comprises a light guide plate comprising a first face and a second face opposite to the first face, wherein an angle between the first face and a main axis of the curved reflection member is configured to make the light incident into the light guide plate propagate by total reflection between the first face and the second face.

In some embodiments, a light modulation layer is disposed on one of the first face and the second face, and the light extraction structure is disposed on the other; a total reflection angle arcsin(n2/n1) at an interface between the light guide plate and the light modulation layer is between $\theta 1$ and $\theta 2$, wherein n1 is a refractive index of the light guide plate, n2 is a refractive index of the light modulation layer, and $\theta 1$ and $\theta 2$ are respectively a minimum incident angle and a maximum incident angle of the light incident into the light guide plate.

In some embodiments, the light extraction structure comprises a plurality of light extraction units spaced apart from each other, and the light collimation device further comprises a planarization layer covering the plurality of light extraction units and filling a gap between different light extraction units; wherein the planarization layer has a refractive index of $n_3$ not greater than n2.

In some embodiments, a total reflection angle arcsin(n3/n1) at an interface between the light guide plate and the planarization layer is not greater than $\theta 1$.

In some embodiments, arcsin $(n2/n1)=(\theta 1+\theta 2)/2$.

In some embodiments, the light extraction structure is disposed on at least one of the first face or the second face.

In some embodiments, the angle is in a range of 5° to 15°.

In some embodiments, the light extraction structure comprises at least one of a grating, a prism, or a lens.

In some embodiments, the grating comprises a plurality of grating units, wherein the closer to the light source for one of the plurality of grating units, the smaller a diffraction efficiency of the one of the plurality of grating units.

In some embodiments, the light guide member has a refractive index same as that of the curved reflection member.

According to another aspect of embodiments of the present disclosure, a backlight module is provided. The backlight module comprises: the light collimation device according to any one of the embodiments of the present disclosure; and the light source disposed at the focus of the curved reflection member of the light collimation device.

According to still another aspect of embodiments of the present disclosure, a display device is provided. The display device comprises: the backlight module according to any one of the embodiments of the present disclosure.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure can be understood more clearly from the following detailed description with reference to the accompanying drawings, in which.

Figure 1:
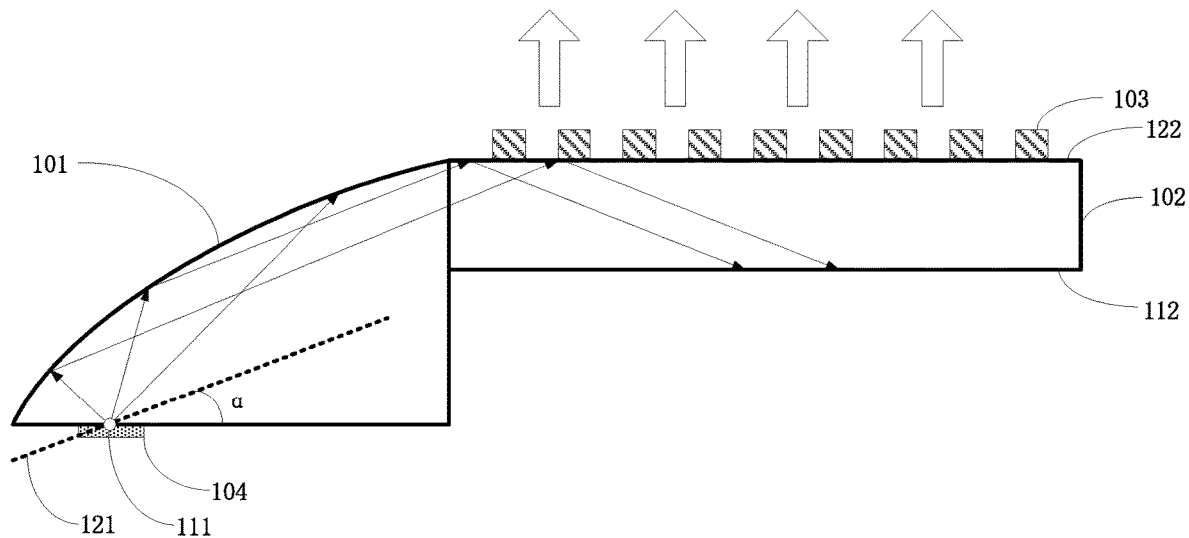
FIG. 1 is a schematic structural view showing a light collimation device according to an embodiment of the present disclosure.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors have noted that, in a known light collimation device, the light source is located at a focus of a curved reflection member and the light emitted from the light source may exit substantially in parallel after being reflected by the curved reflection member. However, since the light source has a certain size, the light reflected by the curved reflection member has a divergence angle. Moreover, the larger the size of the light source is, the greater the divergence angle will be. If the light reflected by the curved reflection member is directly used as a surface light source, a part of the light may not be effectively utilized.

In order to solve the above problem, a light collimation device is provided in embodiments of the present disclosure.

FIG. 1 is a schematic structural view showing a light collimation device according to an embodiment of the present disclosure. As shown in FIG. 1, the light collimation device may comprise a curved reflection member 101, a light guide member 102, and a light extraction structure 103 disposed on the light guide member 102. Here, the curved reflection member 101 is shown to have a focus 111 (shown by a circle) and a main axis 121 (shown by a broken line).

The curved reflection member 101 is configured to reflect a light from the light source 104 disposed at the focus 111 into the light guide member 102. For example, the curved reflection member 101 may comprise a parabolic mirror or a spherical mirror and the like. As some examples, the material of the curved reflection member 101 may comprise resin such as polymethylmethacrylate and the like. The light source 104 may comprise an LED (Light Emitting Diode), an OLED (Organic Light Emitting Diode), a micro LED, and the like. In some embodiments, the light source 104 may comprise a monochromatic light source.

The light guide member 102 is configured to make the light incident into the light guide member 102 propagate by total reflection. In some embodiments, the light guide member 102 may comprise a light guide plate (will be described in detail below). However, the present disclosure is not limited thereto. In other embodiments, the light guide member 102 may also be implemented in other manners as long as the light may propagate by total reflection in the light guide member 102. In some implementations, the refractive index of the light guide member 102 may be the same as that of the curved reflection member 101.

The light extraction structure 103 is configured to extract light from the light guide member 102 in a collimated manner. For example, the light extraction structure may extract light in a collimated manner along a direction shown by the arrow above the light extraction structure 103 in FIG. 1.

In some embodiments, the light extraction structure 103 may comprise, but is not limited to at least one of a grating, a prism, or a lens. Thus, the light may be extracted from the light guide member 102 in a collimated manner by diffraction phenomenon of the grating, or refraction phenomenon of the prism and the lens. For example, the light extraction structure 103 may comprise any one of a grating, a prism, and a lens. For another example, the light extraction structure 103 may comprise any two or more of a grating, a prism, and a lens. In some embodiments, the light extraction structure 103 may comprise a grating which may comprise a plurality of grating units. The closer to the light source 104 for one of the plurality of grating units, the smaller a diffraction efficiency of the one of the plurality of grating units, thus making the light extracted have a more uniform intensity.

In practical applications, the relative positional relationship between the curved reflection member 101 and the light guide member 102 may be optimized such that the light reflected by the curved reflection member 101 is incident into the light guide member 102 in an incidence angle greater than or equal to a total reflection angle of the light guide member 102 (also referred to as a total reflection critical angle). In addition, by optimizing the relative positional relationship between the curved reflection member 101 and the light guide member 102, it is possible to allow as much light as possible to enter the light guide member 102 to improve the utilization rate of the light. Further, the total reflection angle of the light guide member 102 may be adjusted by adjusting a refractive index of the light guide member 102.

In at least one embodiment, the light extraction structure 103 may also be optimized to optimize the degree of collimation of the extracted light, such that the divergence angle of the light extracted by the light extraction member 103 from the light guide member 102 may be less than that of the light reflected by the curved reflection member 101.

The above embodiments provide a light collimation device combining a curved reflection member, a light guide member and a light extraction structure. The curved reflection member may reflect the light from the light source into the light guide member to propagate by total reflection, and the light extraction structure may extract the light from the light guide member in a collimated manner. Such light collimation device may make the divergence angle of the light extracted from the light guide member less than the divergence angle of the light reflected by the curved reflection member.

Some implementations of the light guide member 102 will be introduced below in conjunction with FIG. 1.

Referring to FIG. 1, the light guide member 102 may comprise a light guide plate. Exemplarily, the material of the light guide plate may comprise glass, polymethylmethacrylate, and the like. It should be understood that, in some embodiments, the light guide member 102 may further comprise other members other than the light guide plate, which will not be described in detail here.

The light guide plate may comprise a first face 112 and a second face 122 opposite to the first face 112. Here, the first face 112 and the second face 122 may be substantially in parallel. Additionally, in some cases, the first face 112 may also be referred to as a lower surface, and the second face 122 may also be referred to as an upper surface. It should be understood that, other than the first face 112 and the second face 122, the light guide plate may also comprise other faces such as a light incident face adjacent to the curved reflection member 101.

An angle α between the first face 112 (the second face 122) and a main axis 121 of the curved reflection member 101 may be greater than 0°, such that the light reflected by the curved reflection member 101 may be incident into the light guide plate at an angle of about 90°−α and propagate by total reflection between the first face 112 and the second face 122.

For example, the first face 112 and the second face 122 may be substantially parallel to a horizontal plane in which the curved reflection member 101 is situated. In this case, the main axis 121 of the curved reflection member 101 may be rotated by a certain angle with respect to a horizontal direction such that there is an angle α between the first face 112 (second face 122) and the main axis 121. By adjusting the value of a, the incident angle of the light reflected by the curved reflection member 101 which is incident into the light guide plate may be adjusted, so that the light in the light guide plate may propagate by total reflection. In some embodiments, a may range from 5° to 15°, for example 10°, 12°, and the like.

It should be noted that, although the light collimation device shown in FIG. 1 is shown in a way that the light extraction structure 103 is only disposed on the second face 122, the present disclosure is not limited thereto. For example, the light extraction structure 103 may also be disposed only on the first face 112. For another example, the light extraction structure 103 may also be disposed on the first face 112 and the second face 122 respectively. That is, the light extraction structure 103 is disposed on at least one of the first face 112 or the second face 122.

Desirably, the light from the focus 111 after reflection by the curved reflection member 101 may be incident into the light guide plate along a direction parallel to the main axis 121. In this case, the incident angle of the light is 90°−α.

However, since the light source 104 has a certain size, the light, emitted from the light source 104 disposed at the focus 111, after reflection by the curved reflection member 101 does not exit in entirety in parallel with the main axis 121. Therefore, the light incident into the light guide plate has a certain divergence angle. In this case, the incident angle of the light incident into the light guide plate may be expressed as (90°−α)+Δα. If the minimum incident angle and the maximum incident angle of the light incident into the light guide plate are expressed as $\theta_1$ and $\theta_2$ respectively, $\theta_1=(90°-\alpha)-\Delta\alpha$, $\theta_2=(90°-\alpha)+\Delta\alpha$.

The divergence angle of the light in the light guide plate is related to the collimation degree of the light extracted by the light extraction structure 103. In order to reduce the divergence angle of the light in the light guide plate and further improve the collimation degree of the light extracted by the light extraction structure 103, a light modulation layer 201, which will be described below in conjunction with FIG. 2, may be disposed on a surface opposite to a surface in which the light extraction structure 103 is situated.

Figure 2:
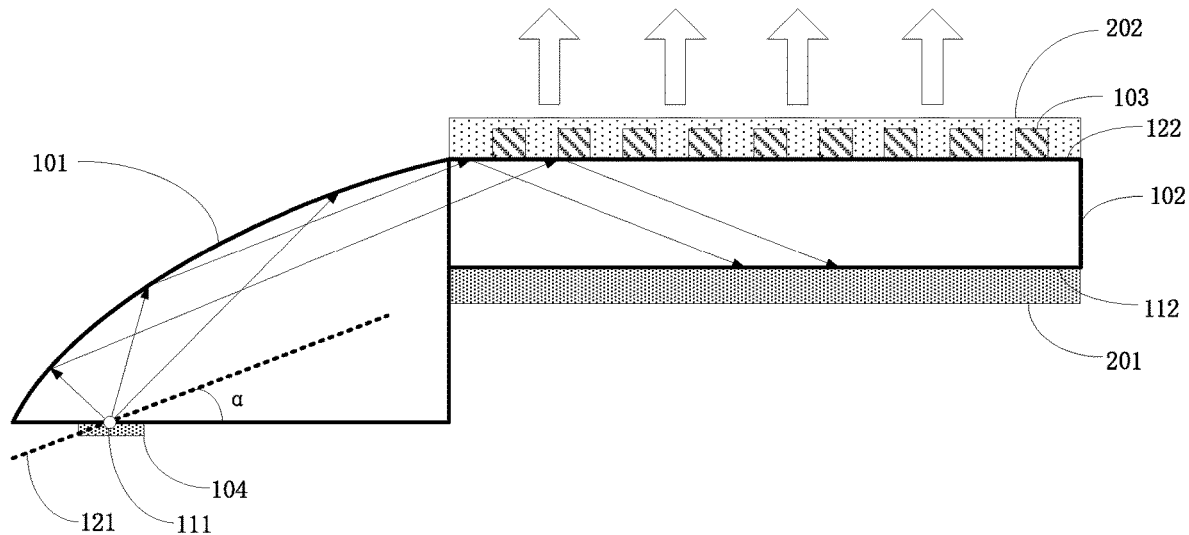
FIG. 2 is a schematic structural view showing a light collimation device according to another embodiment of the present disclosure.

FIG. 2 is a schematic structural view showing a light collimation device according to another embodiment of the present disclosure. In this embodiment, a light modulation layer 201 is disposed on one of the first face 112 and the second face 122, and a light extraction structure 103 is disposed on the other thereof. For example, as shown in FIG. 2, the light extraction structure 103 may be disposed on the second face 122, and the light modulation layer 201 may be disposed on the first face 112. Alternatively, the light extraction structure 103 may be disposed on the first face 112, and the light modulation layer 201 may be disposed on the first face 122.

For example, the light modulation layer 201 may be configured to make the total reflection angle at the interface of the light guide plate and the light modulation layer 201 be between $\theta_1$ and $\theta_2$. Here, $\theta_1$ and $\theta_2$ are respectively a minimum incident angle and a maximum incident angle of the light incident into the light guide plate given above. For example, the total reflection angle at the interface between the light guide plate and the light modulation layer 201 may be expressed as $\arcsin(n_2/n_1)$, where $n_1$ is a refractive index of the light guide plate, and $n_2$ is a refractive index of the light modulation layer 201. In some embodiments, arcsin $(n_2/n_1)$ may be $(\theta_1+\theta_2)/2$.

It can be seen that, in a case where the refractive index $n_1$ of the light guide plate is constant, the total reflection angle arcsin$(n_2/n_1)$ at the interface between the light guide plate and the light modulation layer 201 may be controlled to be between $\theta_1$ and $\theta_2$ by adjusting the refractive index $n_2$ of the light modulation layer 201. Therefore, the light having an incident angle within the interval [arcsin$(n_2/n_1)$, $\theta_2$] is totally reflected back to the light guide plate when being incident on the interface between the light guide plate and the light modulation layer 201, and the light having an incident angle within the interval [$\theta_1$, arcsin$(n_2/n_1)$)) may be filtered, that is, transmit through the light modulation layer 201. The scattering angle of the light in the light guide plate is thus reduced, thereby the degree of collimation of the light extracted by the light extraction structure 103 is further improved. It should be understood that, the refractive index $n_2$ of the light modulation layer 201 may be adjusted to make the light filtered by the light guide plate exit from the light modulation layer 201 rather than being reflected back to the light guide plate again.

In some embodiments, referring to FIG. 2, in order to facilitate disposing other members such as a display panel on the light extraction structure 102, a planarization layer 202 covering the light extraction structure 103 may be formed on the light extraction structure 103. In some embodiments, the light extraction structure 103 may comprise a plurality of light extraction units spaced apart from each other, for example, a plurality of grating units. It should be understood that, each of the grating units may comprise a plurality of parallel slits. The planarization layer 202 may fill a gap between different light extraction units. Here, the refractive index of the planarization layer 202 is different from that of the light extraction unit to ensure that the light extraction unit can extract the light in a collimated manner. For example, it is desirable to have a greater difference between the refractive index of the planarization layer 202 and that of the light extraction unit.

In some embodiments, the planarization layer 202 has a refractive index of $n_3$, where $n_3$ is not greater than the refractive index $n_2$ of the light modulation layer 201.

In some implementations, $n_3$ may be equal to $n_2$. In this case, the total reflection angle arcsin$(n_3/n_1)$ at the interface of the light guide plate and the planarization layer 202 is equal to the total reflection angle arcsin$(n_2/n_1)$ at the interface between the light guide plate and the light modulation layer 201. The light having an incident angle within the interval [arcsin$(n_2/n_1)$, $\theta_2$] is totally reflected back when being incident on the interface between the light guide plate and the planarization layer 202, and the light having an incident angle within the interval [$\theta_1$, arcsin$(n_2/n_1)$)) may be filtered, that is, transmit through the planarization layer 202.

In other implementations, the total reflection angle arcsin $(n_3/n_1)$ at the interface of the light guide plate and the planarization layer 202 is not greater than $\theta_1$. In this case, the light having an incident angle within the interval [$\theta_1$, arcsin $(n_2/n_1)$) is totally reflected when being incident on the interface between the light guide plate and the planarization layer 202, and then exits from the light modulation layer 201. The light having an incident angle within the interval [$\theta_1$, arcsin $(n_2/n_1)$) is prevented from transmitting the planarization layer 202. Thus, the influence on the light extracted by the light extraction structure 103 is avoided, and the degree of collimation of the light extracted by the light extraction structure 103 is even further improved.

Generally, the light emitted from the light source has a certain divergence angle. For example, the light emitted from LED or OLED may typically have a divergence angle of about 120 degrees. If all the light from the light source is to be reflected by the curved reflection member shown in FIG. 1 or 2, the curved reflection member is required to be sufficiently thick. In order to reduce the thickness of the curved reflection member, embodiments of the present disclosure also provide the following solutions, which will be described below in conjunction with FIG. 3.

Figure 3:
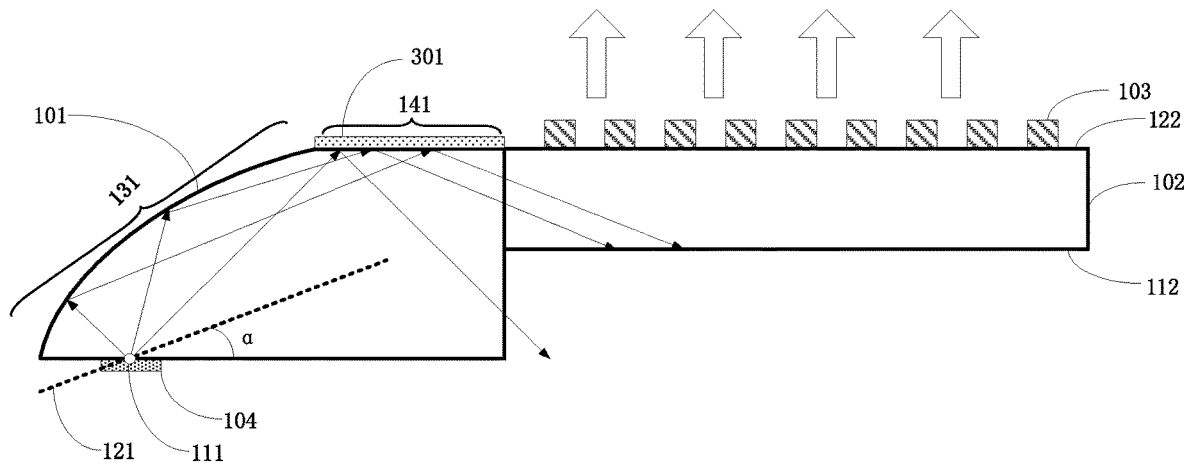
FIG. 3 is a schematic structural view showing a light collimation device according to still another embodiment of the present disclosure.

FIG. 3 is a schematic structural view showing a light collimation device according to still another embodiment of the present disclosure. Next, only the differences between the embodiment shown in FIG. 3 and the embodiment shown in FIG. 1 will be mainly described below, while other identical aspects may refer to the above description.

As shown in FIG. 3, the curved reflection member 101 in this embodiment may comprise a curved surface portion 131 and a flat surface portion 141 adjacent to the curved surface portion 131. In this case, the focus of the curved surface portion 131 is the focus of the curved reflection member 101. The curved surface portion 131 is configured to reflect the light from the light source 104, and the flat surface portion 141 is configured to reflect the light reflected by the curved surface portion to be incident into the light guide member 102. For example, a part of the light reflected by the curved surface portion 131 may be incident into the light guide member 102 after reflection by the flat surface portion 141. For another example, an entirety of the light reflected by the curved surface portion 131 may be incident into the light guide member 102 after reflection by the flat surface portion 141.

Referring to FIG. 3, in some embodiments, a reflection layer 301 may be disposed on the flat surface portion 141. Here, more light after reflection by the curved surface portion 131 may be reflected into the light guide member 102 by the reflection layer 301. As some examples, the material of the reflection layer 301 may comprise a metal material such as silver, aluminum or the like. However, the present disclosure is not limited thereto, and other suitable materials may also be employed as the reflection layer 301.

In addition, in some embodiments, the curved surface portion 131 (for example, an inner surface or an outer surface) may also be disposed with a reflection layer to improve the reflection efficiency of the curved surface portion 131.

In the above embodiments, the light reflected by the curved surface portion may be incident into the light guide member after reflection by the flat surface portion, thus the thickness of the curved reflection member may be reduced.

The inventors have noted that, a part of the light from the light source might be directly incident on the flat surface portion 141 without reflection by the curved surface portion 131. Such a part of the light directly incident on the flat surface portion 141 might not be incident into the light guide member 102 after reflection by the flat surface portion 141 (see FIG. 3). In order to improve the utilization rate of the light, embodiments of the present disclosure also provide the light collimation device shown in FIG. 4.

Figure 4:
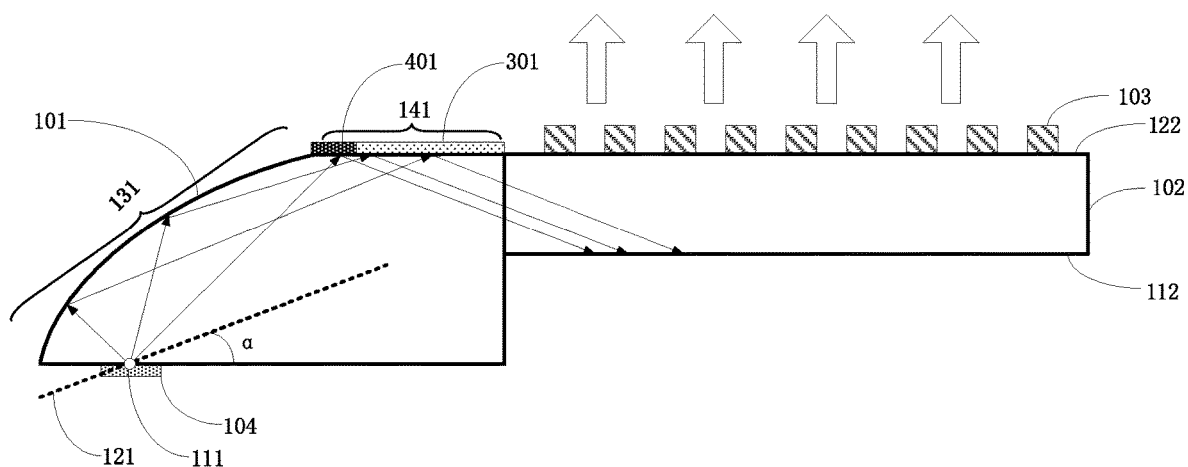
FIG. 4 is a schematic structural view showing a light collimation device according to yet still another embodiment of the present disclosure.

FIG. 4 is a schematic structural view showing a light collimation device according to yet still another embodiment of the present disclosure. Next, only the differences between the embodiment shown in FIG. 4 and the embodiment shown in FIG. 3 will be mainly described below, while other similar aspects may refer to the above description.

As shown in FIG. 4, in the light collimation device of this embodiment, a reflective light modulation grating 401 is further disposed on the flat surface portion 141. For example, the reflective grating 401 may be disposed between the curved surface portion 131 and the reflection layer 301 (if any). The reflective light modulation grating 401 is configured to modulate a light not reflected by the curved surface portion 131 to make the light after modulation be incident into the light guide member 102 and propagate by total reflection.

For example, the reflective light modulation grating 401 may modulate the light not reflected by the curved surface portion 131 to be with an incident angle greater than or equal to the total reflection angle of the light guide member 102. In some embodiments, the reflective light modulation grating 401 may modulate the light not reflected by the curved surface portion 131 to be with a same incident angle substantially, thereby reducing the divergence angle of the light in the light guide member 102 and facilitating light extraction by the light extraction structure 102.

In the above embodiments, on one hand, the reflection layer may reflect the light reflected by the curved surface portion into the light guide member; on the other hand, the reflective light modulation grating may modulate the light not reflected by the curved surface portion to be incident into the light guide member. Therefore, the above embodiments may ensure the utilization rate of light while reducing the thickness of the curved reflection member.

It should be understood that, in some embodiments, in a case where a reflection layer 301 is not disposed on the flat surface portion 141, the reflective light modulation grating 401 may be disposed on the flat surface portion 141. In this way, the utilization rate of the light may be improved.

It should be noted that, although the embodiments shown in FIGS. 3 and 4 do not show the light modulation layer 201 as shown in FIG. 2, those skilled in the art may understand that the light modulation layer 201 may also be disposed on the first face 112 or the second face 122 as shown in FIGS. 3 and 4 to reduce the divergence angle of the light propagated by total reflection in the light guide plate.

Figure 5:
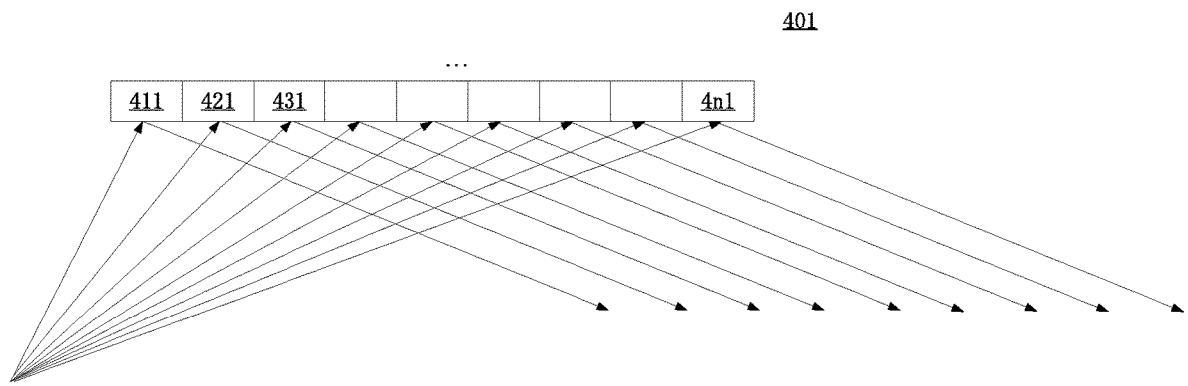
FIG. 5 is a schematic structural view showing a reflective light modulation grating according to an implementation of the disclosure.

FIG. 5 is a schematic structural view showing a reflective light modulation grating according to an implementation of the disclosure. As shown in FIG. 5, the reflective light modulation grating 401 may comprise a plurality of areas with different grating periods (which may also be referred to as grating constants), such as an area 411, an area 421, an area 431, . . . an area $4n_1$, where n is an integer.

Theoretically, it may be known from the grating equation $\sin \theta + \sin \theta_0 = m\lambda/P$ (m=0, +1, +2, . . . ) that, the diffraction angle $\theta$ of the m-order diffraction light is decided by the grating period P, the wavelength $\lambda$ of the incident light, and the incident angle $\theta_0$.

Therefore, the grating periods of different areas may be set according to a desired diffraction angle of the light after modulation. For example, the larger the incidence angle of the light for an area, the smaller the grating period. Suppose that the grating periods corresponding to the area 411, the area 421, the area 431, and the area $4n_1$ are $P_1$, $P_2$, $P_3$, . . . , $P_n$ respectively, then $P_1 > P_2 > P_3 \ldots > P_n$. In this way, the light after modulation may exit in a same direction substantially.

It should be noted that, in practical applications, the number of areas comprised in the reflective light modulation grating 401 may be determined according to the machining capability. For example, within a range of the machining capability, it is desirable to have a larger number of areas of the reflective light modulation grating 401.

In some embodiments, the light guiding device may comprise a plurality of curved reflection members 101 as shown in FIG. 1, 2, 3, or 4.

The process of optimizing the degree of collimation of light will be introduced by enumerating one example below. In this example, the light extraction structure 103 may be a grating with a grating period of 390 nm, and the light guide member 102 may be a light guide plate.

Figure 6:
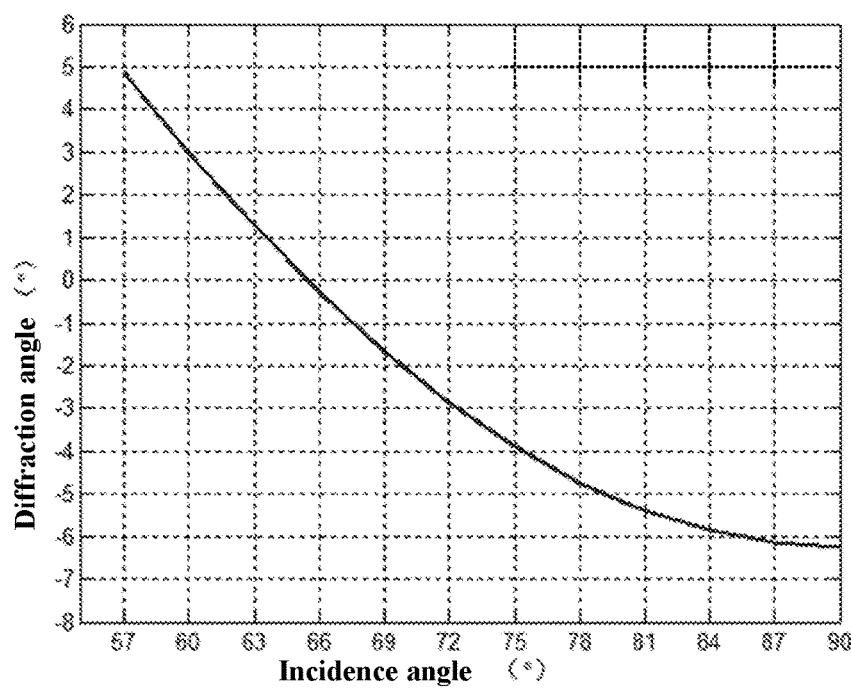
FIG. 6 is a schematic view showing a change in diffraction angle of a grating with incidence angle according to an embodiment of the present disclosure.

FIG. 6 is a schematic view showing a change in diffraction angle of a grating with incidence angle according to an embodiment of the present disclosure.

It may be seen from FIG. 6 that, the grating is more sensitive to an incident angle of less than 80°. That is, when there is a minor variation in the incident angle, there will be a major variation in the corresponding diffraction angle. For example, when the incident angle is 57°, the diffraction angle is 5°; when the incident angle is 60°, the diffraction angle becomes 3°.

However, the grating is less sensitive to an incident angle within a range of 81° to 90°. That is, when there is major variation in the incident angle, there will be a minor variation in the corresponding diffraction angle. For example, when the incident angle varies from 81° to 90°, the diffraction angle will be distributed around −6°.

Therefore, if the degree of collimation of the light extracted by the grating from the light guide plate is to be made better, the incident angle of the light in the light guide plate needs to be within 81° to 90° as far as possible.

The incident angle of the light in the light guide plate may be adjusted by adjusting a positional relationship between the curved reflection member and the light guide plate. For example, the angle $\alpha$ between the main axis 121 of the curved reflection member and the first face 112 may be adjusted to be 5° to 15°, for example, 10°. In this case, the light reflected by the curved reflection member 101 is incident into the light guide plate at an incident angle ranging from 75° to 85°.

Further, the refractive index of the light modulation layer 201 (see FIG. 2) may be adjusted so that the total reflection angle at the interface between the light guide plate and the light modulation layer 201 is greater than 80°. Thus, the light having an incident angle within the range of 75° to 80° is filtered, while the light having an incident angle within the range of 81° to 85° may propagate by total reflection in the light guide plate.

Since the grating is less sensitive to the incident angle within the range of 81° to 90°, the light having an incident angle of 81° to 85° diffracted by the grating will exit with a relatively small divergence angle, for example, ±1° or the like.

According to the above examples, it may be known that, although a part of the light is not employed, such a part of the light accounts for a small proportion. Therefore, the above examples may greatly reduce the divergence angle of the light exiting from the light collimation device in a case of a high light utilization rate.

It should be understood that, although the above examples are described by taking the light extraction structure 103 as a grating and the light guide member 102 as a light guide plate, the above examples are not intended to limit the scope of the present disclosure. Those skilled in the art may adjust one or more of the following parameters according to actual needs: a positional relationship between the curved reflection member and the light guide member, specific parameters of the light extraction structure, the refractive indices of the light modulation layer (if any) and the light guide plate, to reduce the divergence angle of the light exiting from the light collimation device.

Figure 7:
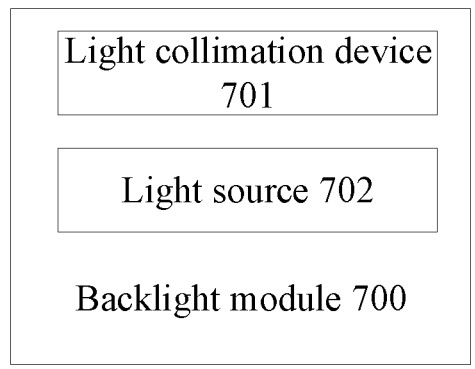
FIG. 7 is a schematic structural view showing a backlight module according to an embodiment of the present disclosure.

In embodiments of the present disclosure, a backlight module is also disposed. FIG. 7 is a schematic structural view showing a backlight module according to an embodiment of the present disclosure. Referring to FIG. 7, the backlight module 700 may comprise a light collimation device 701 provided by any one of the above embodiments of the present disclosure, and a light source 702 disposed at the focus 111 of the curved reflection member 101 of the light collimation device 701.

Figure 8:
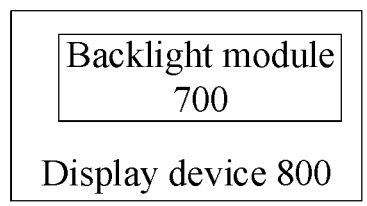
FIG. 8 is a schematic structural view showing a display device according to an embodiment of the present disclosure.

In embodiments of the present disclosure, a display device is also disposed. FIG. 8 is a schematic structural view showing a display device according to an embodiment of the present disclosure. Referring to FIG. 8, the display device 800 may comprise the backlight module 700 provided by any one of the above embodiments. Here, the display device 800 may further comprise members such as a display panel. In some embodiments, the display device may be any product or member having a display function, such as a liquid crystal display, a liquid crystal television, a mobile terminal, a notebook computer, a digital photo frame, a navigator, electronic paper, or the like.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A light collimation device, comprising:
a curved reflection member configured to reflect a light from a light source disposed at a focus of the curved reflection member into a light guide member;
the light guide member configured to make the light incident into the light guide member propagate by total reflection; and
a light extraction structure disposed on the light guide member and configured to extract the light from the light guide member in a collimated manner,
wherein the curved reflection member comprises a curved surface portion and a flat surface portion adjacent to the curved surface portion, the flat surface portion being configured to reflect a light reflected by the curved surface portion into the light guide member, wherein a focus of the curved surface portion is the focus of the curved reflection member, and
wherein a reflective light modulation grating is disposed on the flat surface portion and is configured to modulate a light from the light source not reflected by the curved surface portion to be incident into the light guide member and propagate by total reflection in the light guide member.

2. The light collimation device according to claim 1, wherein a reflection layer is disposed on the flat surface portion.

3. The light collimation device according to claim 2, wherein
the reflective light modulation grating is between the curved surface portion and the reflection layer.

4. The light collimation device according to claim 1, wherein the reflective light modulation grating comprises a plurality of areas with different grating periods, wherein the larger an incidence angle of the light not reflected by the curved surface portion for one of the plurality of areas, the smaller a grating period of the one of the plurality of areas.

5. The light collimation device according to claim 1, wherein light modulated by the reflective light modulation grating is incident into the light guide member at a same incident angle.

6. The light collimation device according to claim 1, wherein the light guide member comprises a light guide plate comprising a first face and a second face opposite to the first face, wherein an angle between the first face and a main axis of the curved reflection member is configured to make the light incident into the light guide plate propagate by total reflection between the first face and the second face.

7. The light collimation device according to claim 6, wherein a light modulation layer is disposed on one of the first face and the second face, and the light extraction structure is disposed on the other;
a total reflection angle $\arcsin(n_2/n_1)$ at an interface between the light guide plate and the light modulation layer is between $\theta_1$ and $\theta_2$, wherein $n_1$ is a refractive index of the light guide plate, $n_2$ is a refractive index of the light modulation layer, and $\theta_1$ and $\theta_2$ are respectively a minimum incident angle and a maximum incident angle of the light incident into the light guide plate.

8. The light collimation device according to claim 7, wherein
the light extraction structure comprises a plurality of light extraction units spaced apart from each other, and the light collimation device further comprises a planarization layer covering the plurality of light extraction units and filling a gap between adjacent light extraction units;
wherein the planarization layer has a refractive index of $n_3$ not greater than $n_2$.

9. The light collimation device according to claim 8, wherein a total reflection angle $\arcsin(n_3/n_1)$ at an interface between the light guide plate and the planarization layer is not greater than $\theta_1$.

10. The light collimation device according to claim 7, wherein
$\mathrm{Arcsin}\,(n_2/n_1)=(\theta_1+\theta_2)/2$.

11. The light collimation device according to claim 6, wherein the light extraction structure is disposed on at least one of the first face or the second face.

12. The light collimation device according to claim 6, wherein the angle is in a range of 5° to 15°.

13. The light collimation device according to claim 1, wherein the light extraction structure comprises at least one of a grating, a prism, or a lens.

14. The light collimation device according to claim 13, wherein the grating comprises a plurality of grating units, wherein the closer to the light source for one of the plurality of grating units, the smaller a diffraction efficiency of the one of the plurality of grating units.

15. The light collimation device according to claim 1, wherein the light guide member has a refractive index same as that of the curved reflection member.

16. A backlight module, comprising:
the light collimation device according to claim 1; and
the light source disposed at the focus of the curved reflection member of the light collimation device.

17. A display device, comprising: the backlight module according to claim 16.

18. A light collimation device, comprising:
a curved reflection member configured to reflect a light from a light source disposed at a focus of the curved reflection member into a light guide member;
the light guide member configured to make the light incident into the light guide member propagate by total reflection; and
a light extraction structure disposed on the light guide member and configured to extract the light from the light guide member in a collimated manner,
wherein the light guide member comprises a light guide plate comprising a first face and a second face opposite to the first face, wherein an angle between the first face and a main axis of the curved reflection member is configured to make the light incident into the light guide plate propagate by total reflection between the first face and the second face,
wherein a light modulation layer is disposed on one of the first face and the second face, and the light extraction structure is disposed on the other, and
wherein a total reflection angle $\arcsin(n_2/n_1)$ at an interface between the light guide plate and the light modulation layer is between $\theta_1$ and $\theta_2$, wherein $n_1$ is a refractive index of the light guide plate, $n_2$ is a refractive index of the light modulation layer, and $\theta_1$ and $\theta_2$ are respectively a minimum incident angle and a maximum incident angle of the light incident into the light guide plate.

19. The light collimation device according to claim 18, wherein
the light extraction structure comprises a plurality of light extraction units spaced apart from each other, and the light collimation device further comprises a planarization layer covering the plurality of light extraction units and filling a gap between adjacent light extraction units,
wherein the planarization layer has a refractive index of $n_3$ not greater than $n_2$.

20. A light collimation device, comprising:
a curved reflection member configured to reflect a light from a light source disposed at a focus of the curved reflection member into a light guide member;
the light guide member configured to make the light incident into the light guide member propagate by total reflection; and
a light extraction structure disposed on the light guide member and configured to extract the light from the light guide member in a collimated manner,
wherein the light extraction structure comprises at least one of a grating, a prism, or a lens, the grating comprising a plurality of grating units, wherein the closer to the light source for one of the plurality of grating units, the smaller a diffraction efficiency of the one of the plurality of grating units.

* * * * *